(12) United States Patent
Potter et al.

(10) Patent No.: US 11,708,050 B2
(45) Date of Patent: *Jul. 25, 2023

(54) METHODS OF PRE-GENERATING INSURANCE CLAIMS

(71) Applicant: STATE FARM MUTUAL AUTOMOBILE INSURANCE COMPANY, Bloomington, IL (US)

(72) Inventors: Thomas Michael Potter, Normal, IL (US); Mark E. Clauss, Bloomington, IL (US); Dustin Ryan Carter, Normal, IL (US); Douglas Albert Graff, Mountain View, MO (US); Megan Michal Baumann, Bloomington, IL (US); Atlanta Bonnom, Bloomington, IL (US); Craig Cope, Bloomington, IL (US); Jennifer Luella Lawyer, Bloomington, IL (US); Curtis Simpson, Bloomington, IL (US); Nathan W. Baumann, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,152

(22) Filed: Jan. 14, 2022

(65) Prior Publication Data

US 2022/0138861 A1 May 5, 2022

Related U.S. Application Data

(63) Continuation of application No. 16/038,259, filed on Jul. 18, 2018, now Pat. No. 11,257,163, which is a
(Continued)

(51) Int. Cl.
*G06Q 40/08* (2012.01)
*B60R 25/04* (2013.01)
(Continued)

(52) U.S. Cl.
CPC ............ *B60R 25/04* (2013.01); *B60R 25/102* (2013.01); *B60W 40/08* (2013.01); *B60W 40/09* (2013.01);
(Continued)

(58) Field of Classification Search
CPC ...................................................... G06Q 40/08
(Continued)

(56) References Cited

U.S. PATENT DOCUMENTS 8,260,639 B1 * 9/2012 Medina, III ........... G06Q 40/08
705/4
8,417,212 B2 4/2013 Cepuran et al.
(Continued)

FOREIGN PATENT DOCUMENTS

CA 3052577 A1 8/2018
JP 2004-054412 A 2/2004
(Continued)

*Primary Examiner* — Cho Kwong
(74) *Attorney, Agent, or Firm* — Faegre Drinker Biddle & Reath

(57) ABSTRACT

In system and methods for pre-generating insurance claims, accident data associated with a vehicle accident involving a driver may be collected. The accident data may be analyzed, and a likely severity of the vehicle accident may be determined based upon the analysis of the accident data. An estimated insurance claim may be generated based upon the determined likely severity of the vehicle accident, and transmitted, via wireless communication, from one or more remote servers to a mobile device associated with the driver to facilitate presenting all, or a portion of, the estimated insurance claim to the driver or the insured. A wireless
(Continued)

communication from the driver or insured indicating approval, rejection or modification of the estimated insurance claim may be received. The estimated insurance claim may be handled in accordance with the approval, rejection or modification.

18 Claims, 5 Drawing Sheets

Related U.S. Application Data continuation of application No. 14/798,770, filed on Jul. 14, 2015, now Pat. No. 10,102,587.

(60) Provisional application No. 62/145,033, filed on Apr. 9, 2015, provisional application No. 62/145,232, filed on Apr. 9, 2015, provisional application No. 62/145,022, filed on Apr. 9, 2015, provisional application No. 62/145,028, filed on Apr. 9, 2015, provisional application No. 62/145,029, filed on Apr. 9, 2015, provisional application No. 62/145,032, filed on Apr. 9, 2015, provisional application No. 62/145,234, filed on Apr. 9, 2015, provisional application No. 62/145,027, filed on Apr. 9, 2015, provisional application No. 62/145,228, filed on Apr. 9, 2015, provisional application No. 62/145,145, filed on Apr. 9, 2015, provisional application No. 62/145,024, filed on Apr. 9, 2015, provisional application No. 62/040,735, filed on Aug. 22, 2014, provisional application No. 62/027,021, filed on Jul. 21, 2014.

(51) Int. Cl.
| | |
|---|---|
| *G08B 25/00* | (2006.01) |
| *B60R 25/102* | (2013.01) |
| *B60W 40/09* | (2012.01) |
| *B60W 40/08* | (2012.01) |
| *G08B 21/02* | (2006.01) |
| *B60W 30/08* | (2012.01) |

(52) U.S. Cl.
CPC ............ *G06Q 40/08* (2013.01); *G08B 21/02* (2013.01); *G08B 25/00* (2013.01); *B60W 2030/082* (2013.01)

(58) Field of Classification Search
USPC .............................................. 705/4
See application file for complete search history.

(56) References Cited

U.S. PATENT DOCUMENTS

| | | | |
|---|---|---|---|
| 9,633,487 | B2 | 4/2017 | Wright |
| 10,145,684 | B1 | 12/2018 | Tofte et al. |
| 10,192,369 | B2 | 1/2019 | Wright |
| 10,198,879 | B2 | 2/2019 | Wright |
| 10,387,962 | B1 | 8/2019 | Potter et al. |
| 10,572,943 | B1 | 2/2020 | Tye et al. |
| 10,747,007 | B2 | 8/2020 | Tanriover et al. |
| 10,852,728 | B2 | 12/2020 | Tanriover |
| 11,046,443 | B2 | 6/2021 | Tanriover |
| 11,069,215 | B1 | 7/2021 | Hollenstain et al. |
| 11,151,859 | B1 | 10/2021 | Hollenstain et al. |
| 11,210,023 | B2 | 12/2021 | Tanriover et al. |
| 11,256,104 | B2 | 2/2022 | Tanriover et al. |
| 11,273,778 | B1 | 3/2022 | Lakhani et al. |
| 11,404,075 | B1 | 8/2022 | Lakhani et al. |
| 2008/0310742 | A1 | 12/2008 | Kostrzewski et al. |
| 2011/0153367 | A1* | 6/2011 | Amigo ............... G06Q 40/08 701/31.4 |
| 2014/0063064 | A1* | 3/2014 | Seo ..................... G08G 1/163 345/633 |
| 2018/0099679 | A1 | 4/2018 | Huang et al. |
| 2018/0225769 | A1 | 8/2018 | Slusar et al. |
| 2019/0039743 | A1 | 2/2019 | Tanriover |
| 2019/0049736 | A1 | 2/2019 | Tanriover et al. |
| 2019/0049965 | A1 | 2/2019 | Tanriover |
| 2019/0228654 | A1 | 7/2019 | Olsen et al. |
| 2020/0192603 | A1 | 6/2020 | Tanriover et al. |
| 2020/0379266 | A1 | 12/2020 | Tanriover et al. |
| 2021/0150694 | A1 | 5/2021 | Pohl et al. |
| 2022/0126863 | A1 | 4/2022 | Moustafa et al. |
| 2022/0126864 | A1 | 4/2022 | Moustafa et al. |
| 2022/0126878 | A1 | 4/2022 | Moustafa et al. |

FOREIGN PATENT DOCUMENTS

| | | |
|---|---|---|
| JP | 2012-058827 A | 3/2012 |
| KR | 20-0355384 Y1 | 7/2004 |
| WO | 2019/005108 A1 | 1/2019 |

\* cited by examiner

METHODS OF PRE-GENERATING INSURANCE CLAIMS

CROSS-REFERENCE TO RELATED APPLICATIONS

This application is a continuation of and claims the benefit of U.S. patent application Ser. No. 16/038,259, entitled "Methods of Pre-generating Insurance Claims" and filed Jul. 18, 2018, which is a continuation of and claims the benefit of U.S. patent application Ser. No. 14/798,770, entitled "Methods of Pre-generating Insurance Claims" and filed Jul. 14, 2015, now U.S. Pat. No. 10,102,587, which claims the benefit of U.S. Provisional Application No. 62/027,021 (filed Jul. 21, 2014); U.S. Provisional Application No. 62/040,735 (filed Aug. 22, 2014); U.S. Provisional Application No. 62/145,022 (filed Apr. 9, 2015); U.S. Provisional Application No. 62/145,024 (filed Apr. 9, 2015); U.S. Provisional Application No. 62/145,027 (filed Apr. 9, 2015); U.S. Provisional Application No. 62/145,028 (filed Apr. 9, 2015); U.S. Provisional Application No. 62/145,029 (filed Apr. 9, 2015); U.S. Provisional Application No. 62/145,145 (filed Apr. 9, 2015); U.S. Provisional Application No. 62/145,228 (filed Apr. 9, 2015); U.S. Provisional Application No. 62/145,232 (filed Apr. 9, 2015); U.S. Provisional Application No. 62/145,234 (filed Apr. 9, 2015); U.S. Provisional Application No. 62/145,032 (filed Apr. 9, 2015); and U.S. Provisional Application No. 62/145,033 (filed Apr. 9, 2015). The entirety of each of the foregoing provisional applications is incorporated by reference herein.

Additionally, the present application is related to co-pending U.S. patent application Ser. No. 14/798,741 (filed Jul. 14, 2015); co-pending U.S. patent application Ser. No. 14/798,750 (filed Jul. 14, 2015); co-pending U.S. patent application Ser. No. 14/798,757 (filed Jul. 14, 2015); co-pending U.S. patent application Ser. No. 14/798,763 (filed Jul. 14, 2015); co-pending U.S. patent application Ser. No. 14/798,609 (filed Jul. 14, 2015); co-pending U.S. patent application Ser. No. 14/798,615 (filed Jul. 14, 2015); co-pending U.S. patent application Ser. No. 14/798,626 (filed Jul. 14, 2015); co-pending U.S. patent application Ser. No. 14/798,633 (filed Jul. 14, 2015); co-pending U.S. patent application Ser. No. 14/798,769 (filed Jul. 14, 2015); and co-pending U.S. patent application Ser. No. 14/798,745 (filed Jul. 14, 2015).

FIELD

The present embodiments relate generally to telematics data and/or insurance policies. More particularly, the present embodiments relate to performing certain actions, and/or adjusting insurance policies, based upon telematics and/or other data indicative of risk or insured behavior.

BACKGROUND

When a vehicle accident occurs, insured drivers often do not promptly call their insurance providers to report the accident and initiate a claim. For example, a driver may have other pressing concerns, such as seeking medical assistance, finding and contacting a towing company, contacting individuals whom the driver had been on his or her way to meet, and so on. Moreover, the driver may not recall the details of the accident as clearly once some time has passed and he or she has been occupied with other tasks. As a result, the process of determining and making payouts to insured drivers may be delayed, and the payouts (or lack thereof) may not as accurately reflect the circumstances of the accident.

The present embodiments may overcome these and/or other deficiencies.

BRIEF SUMMARY

The present embodiments disclose systems and methods that may relate to the intersection of telematics and insurance. In some embodiments, for example, telematics and/or other data may be collected and used to determine a likely severity of a vehicle accident. The data may be gathered from one or more sources, such as mobile devices (e.g., smart phones, smart glasses, smart watches, smart wearable devices, smart contact lenses, and/or other devices capable of wireless communication); smart vehicles; smart vehicle or smart home mounted sensors; third party sensors or sources of data (e.g., other vehicles, public transportation systems, government entities, and/or the Internet); and/or other sources of information. Based upon the likely severity, an estimated claim may be generated based upon the likely severity.

In another aspect, a computer-implemented method of generating an insurance claim for an insured owning an insurance policy issued by an insurance provider may include (1) collecting, by one or more remote servers associated with the insurance provider, accident data associated with a vehicle accident involving a driver. The accident data may include vehicle telematics data, and/or the driver may be either the insured or another individual associated with the insurance policy issued by the insurance provider. The method may also include (2) analyzing, by the one or more remote servers, the accident data; (3) determining, by the one or more remote servers and based upon the analysis of the accident data, a likely severity of the vehicle accident; (4) generating, by the one or more remote servers, an estimated insurance claim based upon the determined likely severity of the vehicle accident; (5) transmitting, via wireless communication, the estimated insurance claim from the one or more remote servers to a mobile device associated with the driver or the insured to facilitate presenting all, or a portion of, the estimated insurance claim to the driver or the insured; (6) receiving, at the one or more remote servers, a wireless communication from the driver or the insured indicating approval, rejection, or modification of the estimated insurance claim; and/or (7) handling the estimated insurance claim, at the one or more remote servers, in accordance with the approval, rejection, or modification of the estimated insurance claim. The method may include additional, fewer, or alternate actions, including those discussed elsewhere herein.

In another aspect, a system for generating an insurance claim for an insured owning an insurance policy issued by an insurance provider may include one or more processors and one or more memories. The one or more memories may store instructions that, when executed by the one or more processors, cause the one or more processors to (1) collect accident data associated with a vehicle accident involving a driver. The accident data may include vehicle telematics data, and/or the driver may be either the insured or another individual associated with the insurance policy issued by the insurance provider. The instructions may also cause the one or more processors to (2) analyze the accident data. (3) determine, based upon the analysis of the accident data, a likely severity of the vehicle accident; (4) generate an estimated insurance claim based upon the determined likely severity of the vehicle accident; (5) cause the estimated insurance claim to be transmitted, via wireless communication, to a mobile device associated with the driver or the insured to facilitate presenting all, or a portion of, the estimated insurance claim to the driver or the insured; (6) receive a wireless communication from the driver or the insured indicating approval, rejection, or modification of the estimated insurance claim; and/or (6) handle the estimated insurance claim in accordance with the approval, rejection, or modification of the estimated insurance claim.

In another aspect, a computer-implemented method of generating an insurance claim for an insured owning an insurance policy issued by an insurance provider may include (1) collecting, by one or more remote servers associated with the insurance provider, accident data associated with a vehicle accident involving a driver. The accident data may include vehicle telematics data, and/or the driver may be either the insured or another individual associated with the insurance policy issued by the insurance provider. The method may also include (2) analyzing, by the one or more remote servers, the accident data; (3) determining, by the one or more remote servers and based upon the analysis of the accident data, a likely severity of the vehicle accident; (4) generating an estimated insurance claim, at the one or more remote servers, based upon the determined likely severity of the vehicle accident; and/or (5) transmitting, via wireless communication, the estimated insurance claim from the one or more remote servers to the driver or the insured for review, approval, or modification to facilitate prompt handling of the insurance claim. The method may include additional, fewer, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed. It is understood, however, that the present embodiments are not limited to the precise arrangements and instrumentalities shown.

DETAILED DESCRIPTION

The present embodiments may relate to, inter alia, collecting data, including telematics and/or other data, and analyzing the data (e.g., by an insurance provider server or processor) to provide insurance-related benefits to insured individuals, and/or to apply the insurance-related benefits to insurance policies or premiums of insured individuals. For example, the insurance-related benefits may include risk or loss mitigation and/or prevention, and/or may include theft protection, mitigation, and/or avoidance. The insurance-related benefits may also, or instead, include other products and/or services, such as intelligent vehicle routing in real-time, for example. The present embodiments may prevent losses/injury/damage to persons and/or property, and/or reward an insured for exhibiting risk-averse behavior (e.g., in the form of lower insurance premiums or rates, or additional insurance discounts, points, and/or rewards).

I. Exemplary Telematics Data System

Figure 1:
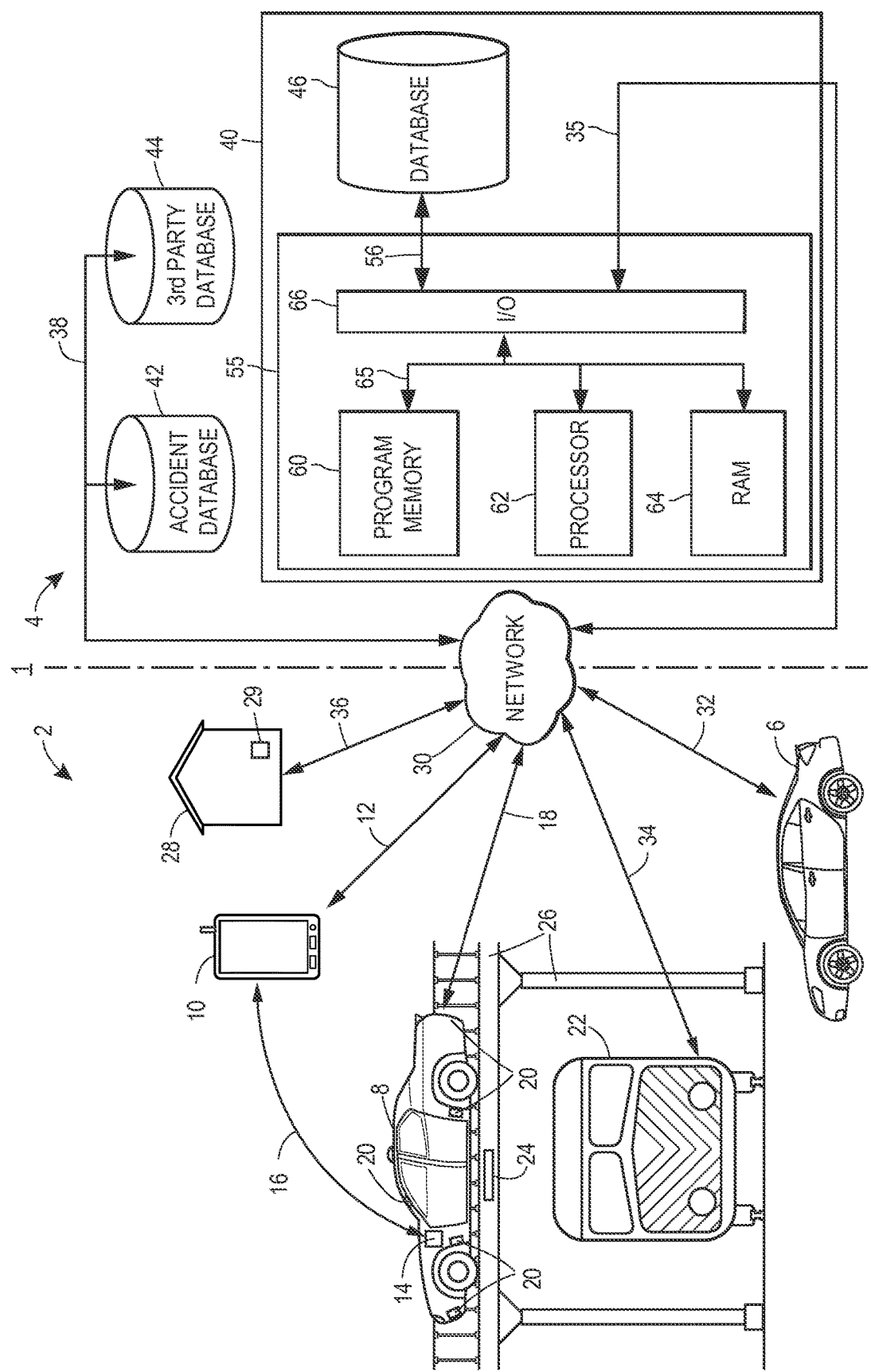
FIG. 1 illustrates an exemplary computer system on which the techniques described herein may be implemented, according to one embodiment.

FIG. 1 illustrates a block diagram of an exemplary telematics system 1 on which the exemplary methods described herein may be implemented. The high-level architecture includes both hardware and software applications, as well as various data communications channels for communicating data between the various hardware and software components. The telematics system 1 may be roughly divided into front-end components 2 and back-end components 4.

The front-end components 2 may obtain information regarding a vehicle 8 (e.g., a car, truck, motorcycle, etc.) and/or the surrounding environment. Information regarding the surrounding environment may be obtained by one or more other vehicles 6, public transportation system components 22 (e.g., a train, a bus, a trolley, a ferry, etc.), infrastructure components 26 (e.g., a bridge, a stoplight, a tunnel, a rail crossing, etc.), smart homes 28 having smart home controllers 29, and/or other components communicatively connected to a network 30. Information regarding the vehicle 8 may be obtained by a mobile device 10 (e.g., a smart phone, a tablet computer, a special purpose computing device, etc.) and/or a smart vehicle controller 14 (e.g., an on-board computer, a vehicle diagnostic system, a vehicle control system or sub-system, etc.), which may be communicatively connected to each other and/or the network 30.

In some embodiments, telematics data may be generated by and/or received from sensors 20 associated with the vehicle 8. Such telematics data from the sensors 20 may be received by the mobile device 10 and/or the smart vehicle controller 14, in some embodiments. Other, external sensors 24 (e.g., sensors associated with one or more other vehicles 6, public transportation system components 22, infrastructure components 26, and/or smart homes 28) may provide further data regarding the vehicle 8 and/or its environment, in some embodiments. For example, the external sensors 24 may obtain information pertaining to other transportation components or systems within the environment of the vehicle 8, and/or information pertaining to other aspect so of that environment. The sensors 20 and the external sensors 24 are described further below, according to some embodiments.

In some embodiments, the mobile device 10 and/or the smart vehicle controller 14 may process the sensor data from sensors 20, and/or other of the front-end components 2 may process the sensor data from external sensors 24. The processed data (and/or information derived therefrom) may then be communicated to the back-end components 4 via the network 30. In other embodiments, the front-end components 2 may communicate the raw sensor data from sensors 20 and/or external sensors 24, and/or other telematics data, to the back-end components 4 for processing. In thin-client embodiments, for example, the mobile device 10 and/or the smart vehicle controller 14 may act as a pass-through communication node for communication with the back-end components 4, with minimal or no processing performed by the mobile device 10 and/or the smart vehicle controller 14. In other embodiments, the mobile device 10 and/or the smart vehicle controller 14 may perform substantial processing of received sensor, telematics, or other data. Summary information, processed data, and/or unprocessed data may be communicated to the back-end components 4 via the network 30.

The mobile device 10 may be a general-use personal computer, cellular phone, smart phone, tablet computer, or a dedicated vehicle use monitoring device. In some embodiments, the mobile device 10 may include a wearable device such as a smart watch, smart glasses, wearable smart technology, or a pager. Although only one mobile device 10 is illustrated, it should be understood that a plurality of mobile devices may be used in some embodiments. The smart vehicle controller 14 may be a general-use on-board computer capable of performing many functions relating to vehicle operation, an on-board computer system or subsystem, or a dedicated computer for monitoring vehicle operation and/or generating telematics data. Further, the smart vehicle controller 14 may be installed by the manufacturer of the vehicle 8 or as an aftermarket modification or addition to the vehicle 8. Either or both of the mobile device 10 and the smart vehicle controller 14 may communicate with the network 30 over link 12 and link 18, respectively. Additionally, the mobile device 10 and smart vehicle controller 14 may communicate with one another directly over link 16. In some embodiments, the mobile device 10 and/or the smart vehicle controller 14 may communicate with other of the front-end components 2, such as the vehicles 6, public transit system components 22, infrastructure components 26, and/or smart homes 28, either directly or indirectly (e.g., via the network 30).

The one or more sensors 20 referenced above may be removably or fixedly disposed within (and/or on the exterior of) the vehicle 8, within the mobile device 10, and/or within the smart vehicle controller 14, for example. The sensors 20 may include any one or more of various different sensor types, such as an ignition sensor, an odometer, a system clock, a speedometer, a tachometer, an accelerometer, a gyroscope, a compass, a geolocation unit (e.g., a GPS unit), a camera and/or video camera, a distance sensor (e.g., radar, LIDAR, etc.), and/or any other sensor or component capable of generating or receiving data regarding the vehicle 8 and/or the environment in which the vehicle 8 is located.

Some of the sensors 20 (e.g., radar, LIDAR, ultrasonic, infrared, or camera units) may actively or passively scan the vehicle environment for objects (e.g., other vehicles, buildings, pedestrians, etc.), traffic control elements (e.g., lane markings, signs, signals, etc.), external conditions (e.g., weather conditions, traffic conditions, road conditions, etc.), and/or other physical characteristics of the environment. Other sensors of sensors 20 (e.g., GPS, accelerometer, or tachometer units) may provide operational and/or other data for determining the location and/or movement of the vehicle 8. Still other sensors of sensors 20 may be directed to the interior or passenger compartment of the vehicle 8, such as cameras, microphones, pressure sensors, thermometers, or similar sensors to monitor the vehicle operator and/or passengers within the vehicle 8.

The external sensors 24 may be disposed on or within other devices or components within the vehicle's environment (e.g., other vehicles 6, infrastructure components 26, etc.), and may include any of the types of sensors listed above. For example, the external sensors 24 may include sensors that are the same as or similar to sensors 20, but disposed on or within some of the vehicles 6 rather than the vehicle 8.

To send and receive information, each of the sensors 20 and/or external sensors 24 may include a transmitter and/or a receiver designed to operate according to predetermined specifications, such as the dedicated short-range communication (DSRC) channel, wireless telephony, Wi-Fi, or other existing or later-developed communications protocols. As used herein, the terms "sensor" or "sensors" may refer to the sensors 20 and/or external sensors 24.

The other vehicles 6, public transportation system components 22, infrastructure components 26, and/or smart homes 28 may be referred to herein as "external" data sources. The other vehicles 6 may include any other vehicles, including smart vehicles, vehicles with telematics-capable mobile devices, autonomous vehicles, and/or other vehicles communicatively connected to the network 30 via links 32.

The public transportation system components 22 may include bus, train, ferry, ship, airline, and/or other public transportation system components. Such components may include vehicles, tracks, switches, access points (e.g., turnstiles, entry gates, ticket counters, etc.), and/or payment locations (e.g., ticket windows, fare card vending machines, electronic payment devices operated by conductors or passengers, etc.), for example. The public transportation system components 22 may further be communicatively connected to the network 30 via a link 34, in some embodiments.

The infrastructure components 26 may include smart infrastructure or devices (e.g., sensors, transmitters, etc.) disposed within or communicatively connected to transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. In some embodiments, the infrastructure components 26 may be communicatively connected to the network 30 via a link (not shown in FIG. 1).

The smart homes 28 may include dwellings or other buildings that generate or collect data regarding their condition, occupancy, proximity to a mobile device 10 or vehicle 8, and/or other information. The smart homes 28 may include smart home controllers 29 that monitor the local environment of the smart home, which may include sensors (e.g., smoke detectors, radon detectors, door sensors, window sensors, motion sensors, cameras, etc.). In some embodiments, the smart home controller 29 may include or be communicatively connected to a security system controller for monitoring access and activity within the environment. The smart home 28 may further be communicatively connected to the network 30 via a link 36, in some embodiments.

The external data sources may collect data regarding the vehicle 8, a vehicle operator, a user of an insurance program, and/or an insured of an insurance policy. Additionally, or alternatively, the other vehicles 6, the public transportation system components 22, the infrastructure components 26, and/or the smart homes 28 may collect such data, and provide that data to the mobile device 10 and/or the smart vehicle controller 14 via links not shown in FIG. 1.

In some embodiments, the front-end components 2 communicate with the back-end components 4 via the network 30. The network 30 may include a proprietary network, a secure public internet, a virtual private network and/or one or more other types of networks, such as dedicated access lines, plain ordinary telephone lines, satellite links, cellular data networks, or combinations thereof. In embodiments where the network 30 comprises the Internet, data communications may take place over the network 30 via an Internet communication protocol.

The back-end components 4 may use a remote server 40 to receive data from the front-end components 2, determine characteristics of vehicle use, determine risk levels, modify insurance policies, and/or perform other processing functions in accordance with any of the methods described herein. In some embodiments, the server 40 may be associated with an insurance provider, either directly or indirectly. The server 40 may include one or more computer processors adapted and configured to execute various software applications and components of the telematics system 1.

The server 40 may further include a database 46, which may be adapted to store data related to the operation of the vehicle 8 and/or other information. As used herein, the term "database" may refer to a single database or other structured data storage, or to a collection of two or more different databases or structured data storage components. Additionally, the server 40 may be communicatively coupled via the network 30 to one or more data sources, which may include an accident database 42 and/or a third party database 44. The accident database 42 and/or third party database 44 may be communicatively connected to the network via a communication link 38. The accident database 42 and/or the third party database 44 may be operated or maintained by third parties, such as commercial vendors, governmental entities, industry associations, nonprofit organizations, or others.

The data stored in the database 46 might include, for example, dates and times of vehicle use, duration of vehicle use, speed of the vehicle 8, RPM or other tachometer readings of the vehicle 8, lateral and longitudinal acceleration of the vehicle 8, incidents or near-collisions of the vehicle 8, communications between the vehicle 8 and external sources (e.g., other vehicles 6, public transportation system components 22, infrastructure components 26, smart homes 28, and/or external information sources communicating through the network 30), environmental conditions of vehicle operation (e.g., weather, traffic, road condition, etc.), errors or failures of vehicle features, and/or other data relating to use of the vehicle 8 and/or the vehicle operator. Prior to storage in the database 46, some of the data may have been uploaded to the server 40 via the network 30 from the mobile device 10 and/or the smart vehicle controller 14. Additionally, or alternatively, some of the data may have been obtained from additional or external data sources via the network 30. Additionally, or alternatively, some of the data may have been generated by the server 40. The server 40 may store data in the database 46 and/or may access data stored in the database 46 when executing various functions and tasks associated with the methods described herein.

The server 40 may include a controller 55 that is operatively connected to the database 46 via a link 56. It should be noted that, while not shown in FIG. 1, one or more additional databases may be linked to the controller 55 in a known manner. For example, separate databases may be used for sensor data, vehicle insurance policy information, and vehicle use information. The controller 55 may include a program memory 60, a processor 62 (which may be called a microcontroller or a microprocessor), a random-access memory (RAM) 64, and an input/output (I/O) circuit 66, all of which may be interconnected via an address/data bus 65.

It should be appreciated that although only one microprocessor 62 is shown, the controller 55 may include multiple microprocessors 62. Similarly, the memory of the controller 55 may include multiple RAMs 64 and multiple program memories 60. Although the I/O circuit 66 is shown as a single block, it should be appreciated that the I/O circuit 66 may include a number of different types of I/O circuits. The RAM 64 and program memories 60 may be implemented as semiconductor memories, magnetically readable memories, or optically readable memories, for example. The controller 55 may also be operatively connected to the network 30 via a link 35.

The server 40 may further include a number of software applications stored in a program memory 60. The various software applications on the server 40 may include specific programs, routines, or scripts for performing processing functions associated with the methods described herein. Additionally, or alternatively, the various software application on the server 40 may include general-purpose software applications for data processing, database management, data analysis, network communication, web server operation, or other functions described herein or typically performed by a server. The various software applications may be executed on the same computer processor or on different computer processors. Additionally, or alternatively, the software applications may interact with various hardware modules that may be installed within or connected to the server 40. Such modules may implement part of all of the various exemplary methods discussed herein or other related embodiments.

In some embodiments, the server 40 may be a remote server associated with or operated by or on behalf of an insurance provider. The server 40 may be configured to receive, collect, and/or analyze telematics and/or other data in accordance with any of the methods described herein. The server 40 may be configured for one-way or two-way wired or wireless communication via the network 30 with a number of telematics and/or other data sources, including the accident database 42, the third party database 44, the database 46 and/or the front-end components 2. For example, the server 40 may be in wireless communication with mobile device 10; insured smart vehicles 8; smart vehicles of other motorists 6; smart homes 28; present or past accident database 42; third party database 44 operated by one or more government entities and/or others; public transportation system components 22 and/or databases associated therewith; smart infrastructure components 26; and/or the Internet. The server 40 may be in wired or wireless communications with other sources of data, including those discussed elsewhere herein.

Although the telematics system 1 is shown in FIG. 1 to include one vehicle 8, one mobile device 10, one smart vehicle controller 14, one other vehicle 6, one public transportation system component 22, one infrastructure component 26, one smart home 28, and one server 40, it should be understood that different numbers of each may be utilized. For example, the system 1 may include a plurality of servers 40 and hundreds or thousands of mobile devices 10 and/or smart vehicle controllers 14, all of which may be interconnected via the network 30. Furthermore, the database storage or processing performed by the server 40 may be distributed among a plurality of servers in an arrangement known as "cloud computing." This configuration may provide various advantages, such as enabling near real-time uploads and downloads of information as well as periodic uploads and downloads of information. This may in turn support a thin-client embodiment of the mobile device 10 or smart vehicle controller 14 discussed herein.

Figure 2:
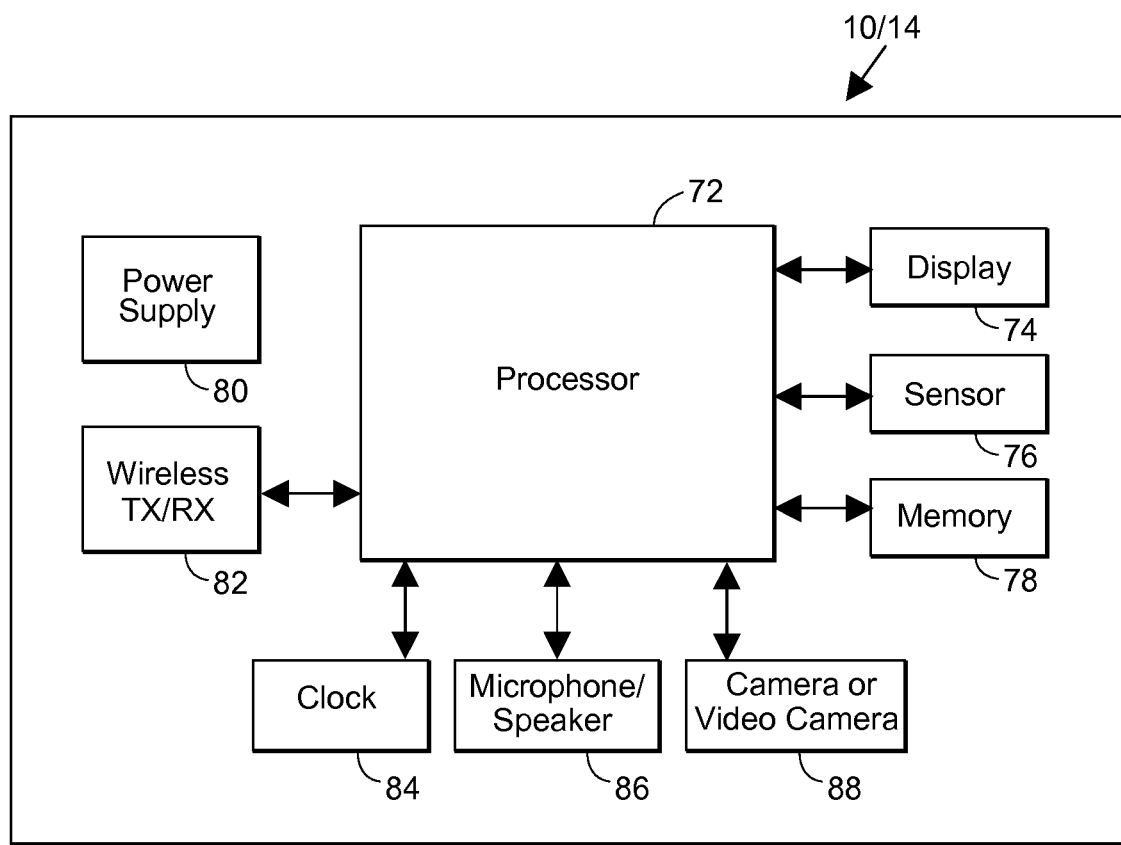
FIG. 2 illustrates an exemplary mobile device or smart vehicle controller that may collect, receive, generate and/or send telematics and/or other data for purposes of the techniques described herein, according to one embodiment.

FIG. 2 illustrates a block diagram of an exemplary mobile device 10 and/or smart vehicle controller 14. The mobile device 10 and/or smart vehicle controller 14 may include a processor 72, display 74, sensor 76, memory 78, power supply 80, wireless radio frequency transceiver 82, clock 84, microphone and/or speaker 86, and/or camera or video camera 88. In other embodiments, the mobile device and/or smart vehicle controller may include additional, fewer, and/or alternate components.

The sensor 76 may be able to record audio or visual information. If FIG. 2 corresponds to the mobile device 10, for example, the sensor 76 may be a camera integrated within the mobile device 10. The sensor 76 may alternatively be configured to sense speed, acceleration, directional, fluid, water, moisture, temperature, fire, smoke, wind, rain, snow, hail, motion, and/or other type of condition or parameter, and/or may include a gyro, compass, accelerometer, or any other type of sensor described herein (e.g., any of the sensors 20 described above in connection with FIG. 1). Generally, the sensor 76 may be any type of sensor that is currently existing or hereafter developed and is capable of providing information regarding the vehicle 8, the environment of the vehicle 8, and/or a person.

The memory 78 may include software applications that control the mobile device 10 and/or smart vehicle controller 14, and/or control the display 74 configured for accepting user input. The memory 78 may include instructions for controlling or directing the operation of vehicle equipment that may prevent, detect, and/or mitigate vehicle damage. The memory 78 may further include instructions for controlling a wireless or wired network of a smart vehicle, and/or interacting with mobile device 10 and remote server 40 (e.g., via the network 30).

The power supply 80 may be a battery or dedicated energy generator that powers the mobile device 10 and/or smart vehicle controller 14. The power supply 80 may harvest energy from the vehicle environment and be partially or completely energy self-sufficient, for example.

The transceiver 82 may be configured for wireless communication with sensors 20 located about the vehicle 8, other vehicles 6, other mobile devices similar to mobile device 10, and/or other smart vehicle controllers similar to smart vehicle controller 14. Additionally, or alternatively, the transceiver 82 may be configured for wireless communication with the server 40, which may be remotely located at an insurance provider location.

The clock 84 may be used to time-stamp the date and time that information is gathered or sensed by various sensors. For example, the clock 84 may record the time and date that photographs are taken by the camera 88, video is captured by the camera 88, and/or other data is received by the mobile device 10 and/or smart vehicle controller 14.

The microphone and speaker 86 may be configured for recognizing voice or audio input and/or commands. The clock 84 may record the time and date that various sounds are collected by the microphone and speaker 86, such as sounds of windows breaking, air bags deploying, tires skidding, conversations or voices of passengers, music within the vehicle 8, rain or wind noise, and/or other sound heard within or outside of the vehicle 8.

The present embodiments may be implemented without changes or extensions to existing communications standards. The smart vehicle controller 14 may also include a relay, node, access point, Wi-Fi AP (Access Point), local node, pico-node, relay node, and/or the mobile device 10 may be capable of RF (Radio Frequency) communication, for example. The mobile device 10 and/or smart vehicle controller 14 may include Wi-Fi, Bluetooth, GSM (Global System for Mobile communications), LTE (Long Term Evolution), CDMA (Code Division Multiple Access), UMTS (Universal Mobile Telecommunications System), and/or other types of components and functionality.

II. Telematics Data

Telematics data, as used herein, may include telematics data, and/or other types of data that have not been conventionally viewed as "telematics data." The telematics data may be generated by, and/or collected or received from, various sources. For example, the data may include, indicate, and/or relate to vehicle (and/or mobile device) speed; acceleration; braking; deceleration; turning; time; GPS (Global Positioning System) or GPS-derived location, speed, acceleration, or braking information; vehicle and/or vehicle equipment operation; external conditions (e.g., road, weather, traffic, and/or construction conditions); other vehicles or drivers in the vicinity of an accident; vehicle-to-vehicle (V2V) communications; vehicle-to-infrastructure communications; and/or image and/or audio information of the vehicle and/or insured driver before, during, and/or after an accident. The data may include other types of data, including those discussed elsewhere herein. The data may be collected via wired or wireless communication.

The data may be generated by mobile devices (smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication.

In some embodiments, the data collected may also derive from police or fire departments, hospitals, and/or emergency responder communications; police reports; municipality information; automated Freedom of Information Act requests; and/or other data collected from government agencies and officials. The data from different sources or feeds may be aggregated.

The data generated may be transmitted, via wired or wireless communication, to a remote server, such as a remote server and/or other processor(s) associated with an insurance provider. The remote server and/or associated processors may build a database of the telematics and/or other data, and/or otherwise store the data collected.

The remote server and/or associated processors may analyze the data collected and then perform certain actions and/or issue tailored communications based upon the data, including the insurance-related actions or communications discussed elsewhere herein. The automatic gathering and collecting of data from several sources by the insurance provider, such as via wired or wireless communication, may lead to expedited insurance-related activity, including the automatic identification of insured events, and/or the automatic or semi-automatic processing or adjusting of insurance claims.

In one embodiment, telematics data may be collected by a mobile device (e.g., smart phone) application. An application that collects telematics data may ask an insured for permission to collect and send data about driver behavior and/or vehicle usage to a remote server associated with an insurance provider. In return, the insurance provider may provide incentives to the insured, such as lower premiums or rates, or discounts. The application for the mobile device may be downloadable off of the internet.

III. Pre-Generated Requests for Assistance

Gathered telematics and/or other data (e.g., any type or types of telematics and/or other data described above in Section I and/or Section II) may facilitate determining the severity of (i) an accident; (ii) damage to a vehicle; and/or (iii) the injuries to the persons involved. The data gathered, such as data gathered after the accident, may facilitate determining what vehicle systems are broken or damaged, and/or are in need of minor or substantial repairs. The data gathered may indicate how much vehicle damage has occurred, and whether or not emergency services may be necessary and/or should be called or otherwise contacted.

The telematics and/or other data may also be used to (a) identify a first notice of loss, which in turn may be used to automatically start or initiate the claim handling process; and/or (b) accident reconstruction. Loss identification and/or accident reconstruction may then be paired individually and/or collectively with insurance policy data to automatically generate an insurance claim for an insured event. External data (e.g., public infrastructure or transportation system data) may also be used to determine the type and/or severity of the insured event, and the insurance claim may be modified accordingly.

A. Accident Identification

An insurance provider remote server (e.g., server 40 of FIG. 1) may promptly identify that an accident has occurred from the data gathered. Immediately after which, the remote server may automatically push a pre-generated or tailored message to the insured via wireless communication. The message may request that assistance be sent or directed to the current location of the insured or the vehicle accident. The insured may approve or modify the pre-generated message. The pre-generation of the message requesting assistance may substantially reduce an amount of time that it takes emergency responders to arrive at the scene of a serious accident in some instances. Such time savings may facilitate the saving of human lives with respect to certain vehicle accidents.

As an example, in the case of an accident, communications and/or options may be pushed to the insured's mobile device (e.g., mobile device 10 of FIG. 1). The insured or driver may be asked "Are you injured?"; "Do you need assistance or an ambulance?"; "Do you need the police sent?"; "Is the accident serious or minor?"; "How many people are injured?"; "Is anyone seriously injured?"; and/or "Is your vehicle still drivable?" via their mobile device (such as a smart phone, smart glasses, or wearable device) and/or vehicle wireless communication system.

In some embodiments, a customer or insured may control whether or not emergency responders (e.g., police, fire fighters, ambulances, tow trucks, or even insurance agents) are deployed to the scene of an accident. As suggested above, for example, a mobile device or smart phone application may ask the insured: "Have you been in an accident"; "Do you need assistance?"; "Is the accident serious?"; and/or other questions. The mobile device application may allow an insured to communicate with an insurance provider, and/or communicate directly to emergency responders, more effectively and efficiently than with conventional techniques, and/or may save time when it is of critical importance for those injured in a vehicle accident. Additionally or alternatively, the mobile device (and/or insurance provider remote server, such as remote server 40 of FIG. 1) may automatically call emergency services for the insured once (a) an accident has been detected from analysis of the telematics and/or other data collected, and/or (b) the severity of the accident has been automatically and remotely determined from the data.

B. Post-Accident Services

The mobile device application may (1) include and/or present a list of next steps that the insured should take after a vehicle accident (including instructions on how to submit an insurance claim, or automatically generate an insurance claim, for the insured event); (2) provide post-accident assistance; (3) allow for pre-selecting towing and/or auto repair service providers; and/or (4) call pre-determined persons (e.g., spouse, significant other, loved one, parents, children, friends, etc.). The mobile device application may allow the insured to customize the automatic or semi-automatic services that may be provided and/or presented to the insured when an insured event (e.g., vehicle accident) is detected from analysis of the telematics and/or other data.

The mobile device application (and/or application or functionality of a smart vehicle display or controller, such as smart vehicle controller 14 of FIG. 1) may automatically determine that a vehicle is likely no longer drivable from the data collected. After which, the mobile device application may present towing services (and ratings thereof) on a mobile device of the insured promptly and/or immediately after an accident. The insured may then pick a towing service using the mobile device (and/or smart vehicle) application. The application may then direct the mobile device and/or smart vehicle to electronically notify the towing service of a request for immediate service, such as via wireless communication.

The mobile device and/or smart vehicle application may also present options, such as whether to direct the mobile device and/or smart vehicle to call an insurance agent and/or family members. The options may allow the insured to control the communications, and/or the communications may be pre-set by the insured to automatically occur. For instance, if the telematics and/or other data gathered indicates that the insured is in a serious vehicle accident, the mobile device and/or smart vehicle application may direct the mobile device and/or smart vehicle to automatically notify the insured's spouse of the details of the accident, including severity, accident location, status of the insured or driver, and/or current location of the insured or driver (e.g., in an ambulance or at a hospital).

The mobile device and/or smart vehicle application may automatically generate an insurance claim, and/or attach associated data gathered from various sensors or systems pertinent to the insured event. The application may present the insured an option to automatically submit the automatically generated insurance claim, such as by pressing an icon or button on a user interface or display screen of a mobile device application or smart vehicle control system.

C. Application Customization

The mobile device and/or smart vehicle application may allow the insured to customize the application. The application may allow the insured to select services that are requested when an accident is detected from the data collected. The accident detection may trigger the pre-selected services being requested and/or include contacting police, an ambulance, and/or an insurance agent.

In one embodiment, the insurance provider may keep a user-customized profile of user preferences for an insured. The profile may indicate if a customer call center should proactively call the insured when collected data indicates that an accident has occurred. Also, for a serious accident, the insurance provider remote server may send a text or other message to the responsible insurance agent. The responsible insurance agent may then reach out to the insured promptly to provide individual customer service.

IV. Loss Mitigation Services

Gathered telematics and/or other data (e.g., any type or types of telematics and/or other data described above in Section I and/or Section II) may facilitate loss mitigation services. If an insured event happens, an insurance provider may be remotely notified via wireless communication and/or may identify such insured events based upon data remotely received from vehicles, mobile devices, and/or other electronic devices or systems.

The telematics and/or other data gathered may lead to triage of an auto accident. The data gathered may facilitate identification of whether the claim is minor and may be a "self-serve" type of claim. Additionally or alternatively, the data gathered may indicate that the claim is major, and may involve a fatality or a total loss claim. An application on a smart phone (e.g., mobile device 10 of FIG. 1, or on a smart vehicle controller such as smart vehicle controller 14 of FIG. 1) of the insured may automatically present options for the insured to submit a self-serve type of claim, and/or automatically or semi-automatically get the insured in contact with a representative of the insurance provider for more serious and complex claims. Moreover, any of the assistance requests discussed above in Section III may be automatically sent to the insured, to a first responder (e.g., hospital), and/or to other individuals or entities, for example (e.g., after approval or modification of the request by the insured).

The mobile device and/or smart vehicle application may allow two customers of the same insurance provider to exchange information after an accident. For instance, the applications and/or mobile devices may be equipped for Near Field Communication (NFC). The insurance customers may agree upon the facts of the accident, including who was at fault, and submit a single or joint insurance claim to the insurance provider via their mobile devices. Such submission, especially for minor accidents, may facilitate prompt and efficient handling of the insurance claim(s) by the insurance provider, and alleviate any inconvenience incurred on the part of the insured or group of insurance customers with respect to filing insurance claims and/or other paperwork.

V. Intelligent Routing and Other Recommendations

The present embodiments may facilitate generating intelligent routing and/or other recommendations, and transmitting those to an insured. Intelligent routing recommendations may be based upon vehicle location, route, and/or destination information. The intelligent routing may also be based upon historical data and/or real-time data. The historical and/or real-time data may relate to past or current accidents, weather, traffic, traffic patterns, road conditions, and/or road construction. The intelligent routing functionality, and/or usage (or percentage of usage) thereof, may be used to adjust insurance premiums or rates, and/or discounts.

A. Route Guidance

The intelligent routing recommendations may provide (e.g., via wireless communication, from server 40 of FIG. 1 to mobile device 10, and/or smart vehicle controller 14, of FIG. 1) directions and/or route guidance to a driver or insured based upon traffic patterns and/or actual accident data. The intelligent routing may also take into consideration current weather, construction, traffic, and/or other current conditions.

The intelligent routing recommendations may provide real-time warnings or updates to drivers or insurance customers. Moreover, the intelligent routing recommendations may lead to collision or accident avoidance; more efficient or quicker trips; driving through less traffic or construction; better gas mileage; and/or other benefits.

For instance, short-term or minor road construction projects that may occur with little or no notice may be promptly detected by an insured or the insured's smart vehicle. The GPS location of the minor road construction project (which may be temporarily shutting down a main traffic route or otherwise slowing down traffic) may be sent from the smart vehicle of the insured to the insurance provider remote server. The remote server may then estimate routes to divert traffic around the construction project and notify other insurance customers in the area of an alternate recommended route, such as via wireless communication to their smart vehicles (e.g., vehicle 8 or smart vehicle controller 14 of FIG. 1) or mobile devices (e.g. mobile device 10 of FIG. 1).

The telematics and/or other data may be used to generate messages or alerts transmitted to a smart vehicle or mobile device. A message may indicate that the driver is entering a danger zone associated with an above average risk. For instance, the area may have a lot of ongoing construction, and/or be associated with a higher than average number of accidents.

In one embodiment, the intelligent routing may utilize vehicle-to-vehicle (V2V) communication. The V2V communication may reveal that the vehicles ahead of an insured vehicle are all braking, indicating an accident ahead. The V2V communication data may be sent directly from one vehicle to an insured vehicle (e.g., from vehicle 6 to vehicle 8 of FIG. 1), or alternatively, from one vehicle to a remote telematics or an insurance provider server (e.g., from vehicle 6 to server 40 of FIG. 1). The remote server may then send a message or warning to the insured or insured vehicle to slow down, or even exit a highway and take an alternate route. Access to the remote server may be granted via a subscription service or as a customer service provided by the insurance provider.

V2V communication may include sending a message to a smart vehicle or mobile device directing the smart vehicle or mobile device to automatically start recording telematics data. For instance, V2V communication may indicate that an accident has occurred or is likely to happen. In such situations, automatically recording telematics and/or other data may facilitate accident reconstruction and/or cause of accident determination.

B. Accident Location Reporting

In one embodiment, an insured may opt-in to a program that allows or facilitates, from telematics and/or other data, automatic vehicle accident location reporting. Reporting accident locations in real-time to an insurance provider remote server may facilitate the remote server determining intelligent routes for a group of other insurance customers presently on the road. Customers currently traveling toward the scene of the accident may be re-directed by the remote server. The intelligent routes may direct each of the other insurance customers away from, or to avoid, the scene of the accident, facilitating more efficient and safer travel.

In other words, if one insured self-reports an accident location (e.g., via automatic wireless communication indicating GPS location information), other insurance customers or drivers may be able to promptly and effectively avoid the accident scene through intelligent routing. The intelligent routing may not only consider avoidance of the accident scene, but also other driving risk conditions, such as current traffic, construction, and/or weather conditions, to determine an overall lowest risk alternate route to each vehicle's respective destination.

C. Other Recommendations

Telematics and/or other data gathered (e.g., any type or types of telematics and/or other data described above in Section I and/or Section II) may reveal certain trends about an insured. The data may indicate that the insured is typically driving in areas associated with an above-average number of accidents and/or high crime neighborhoods. The data may also indicate that the insured is driving over the speed limit too much and/or taking turns while driving above a recommended speed. The high risk accident areas or corners may be highlighted on a road map display, such as a vehicle navigation unit, for ease of viewing.

In response, the insurance provider remote server may push appropriate recommendations to the insured, such as recommendations to take certain corners at a slower speed and/or avoid traveling on roads, or through areas, associated with a high number of past accidents. The insurance provider remote server may also present an insurance-related benefit on a display that may be earned if the insured follows the insurance-related recommendations as a means of incentivizing lower risk driving behavior.

VI. Theft Prevention & Mitigation

A telematics device may determine that the driver of a vehicle is not the owner or an authorized driver (e.g., not someone covered under the auto insurance policy). The vehicle and/or mobile device may determine that an unknown driver is attempting or may attempt to start an insured vehicle, or is already driving the insured vehicle, by detecting that an unknown or unrecognized mobile device (e.g., smart phone) is in the vehicle.

As an example, allowed/authorized mobile device Bluetooth signatures may be detected from normal mobile device operation. However, if an unrecognized Bluetooth signal is detected, it may be determined that the vehicle has been stolen, especially if GPS information from the insured's mobile device indicates that the insured is not presently in the insured vehicle. The insured, insurance provider, and/or police may all be automatically notified of the theft.

Additionally or alternatively, a current GPS location of the insured vehicle may be displayed on a virtual map of a mobile device application, along with speed and direction information. The mobile device application with "Find My Car" functionality may be used to locate vehicles parked in large parking lots, such as a shopping mall or airport, where the insured may have forgotten where they have parked, and/or may be used to locate stolen vehicles.

The telematics and/or other data may indicate that a home is left unoccupied for a substantial length of time. For instance, it may be determined from the data collected indicates how often an insured visits and/or how much the insured spends at a second or vacation home. If an insured home is left unoccupied for a substantial amount of time, a recommendation may be sent to the insured to monitor the condition or status of the home more closely to alleviate the risk of theft and/or needed repairs being left unattended to. Insurance savings (e.g., a premium discount) may be provided to the insured in return for following the recommendations provided by the insurance provider.

VII. Exemplary Loss Mitigation Method

Figure 3:
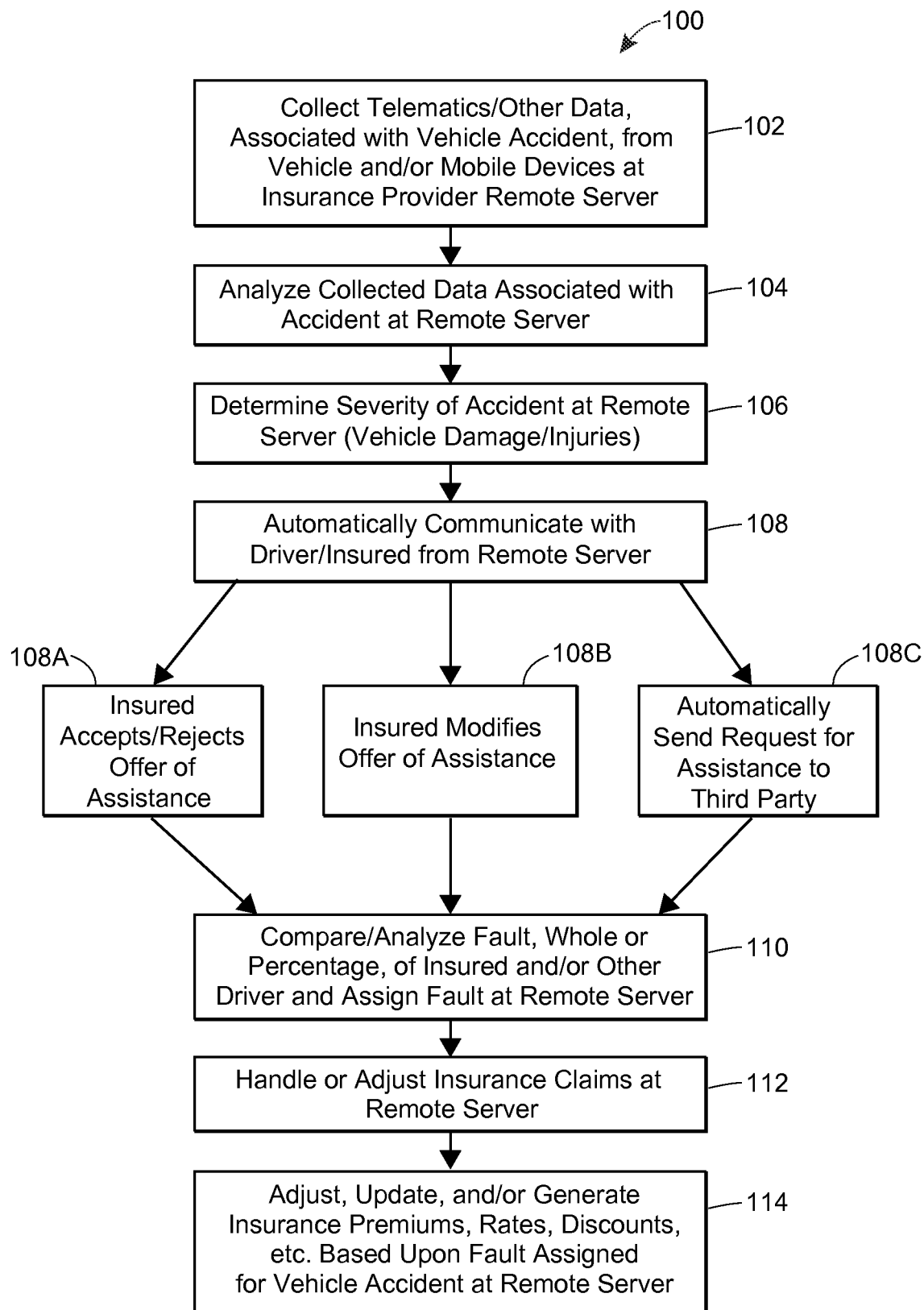
FIG. 3 illustrates an exemplary computer-implemented method of loss mitigation associated with an insured event, according to one embodiment.

FIG. 3 illustrates an exemplary computer-implemented method 100 of loss mitigation associated with a vehicle accident. In some embodiments, the method 100 may be implemented in whole or in part by one or more components of the system 1 depicted in FIG. 1. For example, the method 100 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1.

The method 100 may include collecting accident data associated with a vehicle accident involving a driver (block 102). The driver may be associated with an insurance policy issued by the insurance provider (e.g., an owner of the policy, or another individual listed on the policy). The accident data may include telematics data, and possibly other data, collected from one or more sources. For example, the accident data may include data associated with or generated by one or more mobile devices (e.g., mobile device 10 of FIGS. 1 and 2); an insured vehicle or a computer system of the insured vehicle (e.g., vehicle 8 or smart vehicle controller 14 of FIGS. 1 and 2, or one or more sensors mounted on the vehicle); a vehicle other than the insured vehicle (e.g., vehicle 6 of FIG. 1); vehicle-to-vehicle (V2V) communication (e.g., communications between vehicle 8 and vehicle 6 in FIG. 1); and/or roadside equipment or infrastructure located near a location of the vehicle accident (e.g., infrastructure components 26 of FIG. 1). Generally, the accident data may include any one or more of the types of data discussed above in Section I and/or II (and/or other suitable types of data), and may be collected according to any of the techniques discussed above in Section I and/or 1I (and/or other suitable techniques). The accident data may have been generated by the respective source(s), and/or collected, before, during and/or after the accident.

The method 100 may also include analyzing any or all of the collected accident data (block 104), and determining a likely severity of the accident based upon the analysis (block 106). For example, it may be determined that an accident is likely severe (e.g., likely involves severe personal injury) if accelerometer data included in the accident data indicates a very large and abrupt change in speed. As another example, it may be determined that an accident is likely severe if the accident data (e.g., from a vehicle-mounted camera) shows that the accident was a head-on accident between two vehicles.

The method 100 may also include automatically communicating with the driver (e.g., the insured) (block 108). For example, a communication related to emergency assistance or an emergency assistance recommendation may be generated based upon the likely severity as determined at block 106, and then transmitted from one or more remote servers implementing the method 100 to a mobile device associated with (e.g., owned and/or carried by) the driver, such as mobile device 10 of FIG. 1. The communication may take any of various different forms, such as, for example, "Are you injured?"; "Do you need assistance or an ambulance?"; "Do you need the police sent?"; "Is the accident serious or minor?"; "How many people are injured?"; "Is anyone seriously injured?"; and/or "Is your vehicle still drivable?"

Alternative embodiments and/or scenarios corresponding to block 108 (and/or a process subsequent to block 108) are reflected in blocks 108A through 108C. For example, the driver (e.g., insured) may either accept or reject the emergency assistance indicated in the communication (block 108A), e.g., by making a selection via a user interface of the mobile device, in response to a prompt that appears in connection with the communication. Alternatively, the driver may modify the emergency assistance request or recommendation (block 108B), e.g., by indicating a different type of emergency assistance (ambulance, police, etc.). Again, the modification may be made via a user interface of the mobile device, in response to a prompt that appears in connection with the communication. As yet another alternative, an emergency assistance request may automatically be sent to a third party (e.g., police department, fire department, hospital, etc.) without waiting for any feedback from the driver (block 108C). For example, the communication at block 108 may merely notify the driver that emergency assistance has been requested, and possibly specify the type of assistance requested.

Although not shown in FIG. 3, the method 100 may also include receiving a wireless communication from the driver (e.g., from the mobile device of the driver) in response to the communication at block 108. The wireless communication may indicate whether the driver approved and/or modified (or rejected) the recommended or proposed emergency assistance, for example. In such an embodiment, if the assistance is not rejected, the method 100 may further include notifying a third party (e.g., police department, fire department, hospital, etc.) of the proposed emergency assistance, in accordance with the modifications, if any, made by the driver.

The method 100 may also include determining (e.g., based upon the analysis at block 104) fault of the driver for the accident. As seen in FIG. 3, for example, the fault for the driver (e.g., the insured) and/or for another driver may be compared or otherwise analyzed, and assigned to the appropriate party or parties (block 110). The fault may be determined as one or more binary indicators (e.g., "at fault" or "not at fault"), percentages (e.g., "25% responsible"), ratios or fractions, and/or any other suitable indicator(s) or measure(s) of fault. In some embodiments and/or scenarios, fault for a first individual is implicitly determined based upon the fault that is explicitly determined for another individual (e.g., an insured may implicitly be determined to have 0% fault if another driver is explicitly determined to be 100% at fault).

The method 100 may also include handling an insurance claim associated with the accident (block 112). For example, the fault of the driver (e.g., insured) determined at block 110 may be used to determine the appropriate payout by the insurance provider, or whether another insurance provider should be responsible for payment, etc.

The method 100 may also include adjusting, generating and/or updating one or more insurance-related items (block 114). The insurance-related item(s) may include, for example, parameters of the insurance policy (e.g., a deductible), a premium, a rate, a discount, and/or a reward. The adjustment, generation and/or update may be based upon the fault determined at block 110, or based upon the driver having the emergency assistance functionality that allows the method 100 to be performed (e.g., a mobile device application that enables the driver to receive the communication sent at block 108 and/or to send the wireless communication received at block 108), for example.

In other embodiments, the method 100 may include additional, fewer, or alternate actions as compared to those shown in FIG. 3, including any of those discussed elsewhere herein. For example, the method 100 may further include transmitting information indicative of the adjusted, generated, or updated insurance-related items to a mobile device associated with the driver (or another individual associated with the insurance policy), such as mobile device 10 of FIG. 1, to be displayed on the mobile device for review, modification, or approval by the driver or other individual.

As another example, the method 100 may further include receiving a wireless communication from the driver canceling emergency assistance that has already been requested from a third party. As yet another example, the method 100 may include (1) generating an estimated insurance claim based upon the likely severity determined at block 106. (2) transmitting the estimated insurance claim to the driver's or insured's mobile device to facilitate presenting all or some of the claim to the driver or insured; (3) receiving a wireless communication from the driver or insured indicating approval, rejection or modification of the claim; and/or (4) handling the claim in accordance with the approval, rejection or modification. In still other example embodiments, the method 100 may omit blocks 110, 112 and/or 114.

As can be seen from the above discussion, the method 100 may enable a prompt response by the appropriate personnel (e.g., by first responders with an ambulance), and various components (e.g., in the example system 1) may complete their associated tasks relatively quickly and/or efficiently. For instance, the processor 62 of FIG. 1 may require much less time and/or far fewer processing cycles to request emergency assistance than if an insurance provider employee were to learn about the accident via other means (e.g., a phone call from the insured or passenger) and then instruct processor 62 to generate a request for help.

VIII. Additional Exemplary Loss Mitigation Methods

In one aspect, a computer-implemented method of loss mitigation may be provided. The method may include (1) collecting or receiving telematics and/or other data at or via a remote server associated with an insurance provider, the telematics and/or other data being associated with a vehicle accident involving a specific driver and/or an insured. The insured may own an insurance policy issued by the insurance provider, and the telematics and/or other data may be gathered before, during, and/or after the vehicle accident. The method may include (2) analyzing the telematics and/or other data at and/or via the remote server; (3) determining, at and/or via the remote server, a likely severity of the vehicle accident from the analysis of the telematics and/or other data; (4) generating a communication related to emergency assistance or an emergency assistance recommendation, at the remote server, based upon the likely severity of the vehicle accident that is determined from the analysis of the telematics and/or other data; (5) transmitting, via wireless communication, the communication related to the emergency assistance or emergency assistance recommendation from the remote server to a mobile device or smart vehicle associated with the specific driver and/or insured; (6) receiving, at and/or via the remote server, a wireless communication from the specific driver and/or insured indicating approval, rejection, or modification of the emergency assistance or emergency assistance recommendation; and/or (7) notifying, via communication sent from the remote server, the emergency assistance approved and/or requested by the specific driver to a third party, such as emergency responders (i.e., police or medical personnel). The method may include additional, fewer, or alternate actions, including those discussed elsewhere herein.

For instance, the method may include adjusting, generating, and/or updating, at and/or via the remote server, an insurance policy, premium, rate, discount, and/or reward for the specific driver and/or the insured based upon having the emergency assistance functionality. The method may further comprise transmitting information related to the adjusted, generated, and/or updated insurance policy, premium, rate, discount, and/or reward from the remote server to a mobile device associated with the specific driver and/or insured to facilitate presenting, on a display of the mobile device, all or a portion of the adjusted, generated, and/or updated insurance policy, premium, rate, discount, and/or reward to the specific driver and/or insured for their review, modification, and/or approval. Also, the telematics and/or other data may include the types of data discussed elsewhere herein.

In another aspect, another computer-implemented method of loss mitigation may be provided. The method may include (1) collecting or receiving telematics and/or other data at or via a remote server associated with an insurance provider, the telematics and/or other data being associated with a vehicle accident involving a specific driver and/or an insured. The insured may own an insurance policy issued by the insurance provider, and the telematics and/or other data may be gathered before, during, and/or after the vehicle accident. The method may include (2) analyzing the telematics and/or other data at and/or via the remote server; (3) determining, at and/or via the remote server, a likely severity of the vehicle accident from the analysis of the telematics and/or other data; (4) generating a communication related to emergency assistance or an emergency assistance recommendation, at and/or via the remote server, based upon the likely severity of the vehicle accident that is determined from the analysis of the telematics and/or other data; and/or (5) transmitting, via wireless communication, the communication related to the emergency assistance or emergency assistance recommendation from the remote server directly to a third party, such as a police department, fire department, and/or hospital to facilitate prompt and appropriate emergency responder response to the vehicle accident.

The method may further comprise notifying the specific driver and/or insured, via wireless communication sent from the remote server, that the emergency assistance from the third party has been requested, and/or receiving from the specific driver and/or insured, at or via the remote server, a wireless communication indicating a cancellation of the emergency assistance from the third party and/or that the emergency assistance is not necessary. The method may include adjusting, generating, and/or updating, via the remote server, an insurance policy, premium, rate, discount, and/or reward for the specific driver and/or the insured based upon having the emergency assistance functionality.

The method may include transmitting information related to the adjusted, generated, and/or updated insurance policy, premium, rate, discount, and/or reward from the remote server to a mobile device associated with the specific driver and/or insured to facilitate presenting, on a display of the mobile device, all or a portion of the adjusted, generated, and/or updated insurance policy, premium, rate, discount, and/or reward to the specific driver and/or insured for their review, modification, and/or approval.

IX. Exemplary Estimated Claim Generation Method

In one aspect, a computer-implemented method of generating an insurance claim for an insured may be provided. The method may include: (1) collecting or receiving telematics and/or other data (e.g., any of the telematics and/or other data described above in Section I and/or Section II) at or via a remote server associated with an insurance provider (e.g., server 40 of FIG. 1), the telematics and/or other data being associated with a vehicle accident involving a specific driver and/or an insured, the insured owning an insurance policy issued by the insurance provider and the telematics and/or other data being gathered before, during, and/or after the vehicle accident; (2) analyzing the telematics and/or other data at or via the remote server; (3) determining, at or via the remote server, a likely severity of the vehicle accident from the analysis of the telematics and/or other data; (4) generating an estimated insurance claim, at or via the remote server, based upon the severity of the vehicle accident determined from the analysis of the telematics and/or other data; (5) transmitting, via wireless communication, the estimated insurance claim from the remote server to a mobile device associated with the specific driver and/or insured (e.g., mobile device 10 of FIG. 1) to facilitate presenting all, or a portion of, the estimated insurance claim to the specific driver and/or insured; (6) receiving, at or via the remote server, a wireless communication from the specific driver and/or insured indicating approval, rejection, or modification of the estimated insurance claim; and/or (7) handling or addressing the estimated insurance claim, at or via the remote server, in accordance with the specific driver and/or insured's approval, rejection, or modification of the estimated insurance claim. The method may further include (8) adjusting, generating, and/or updating, at or via the remote server, an insurance policy, premium, rate, discount, and/or reward for the specific driver and/or the insured (or insured vehicle) based upon the estimated insurance claim. The method may include additional, fewer, or alternate actions, including those discussed elsewhere herein.

X. Exemplary Intelligent Routing Method

Figure 4:
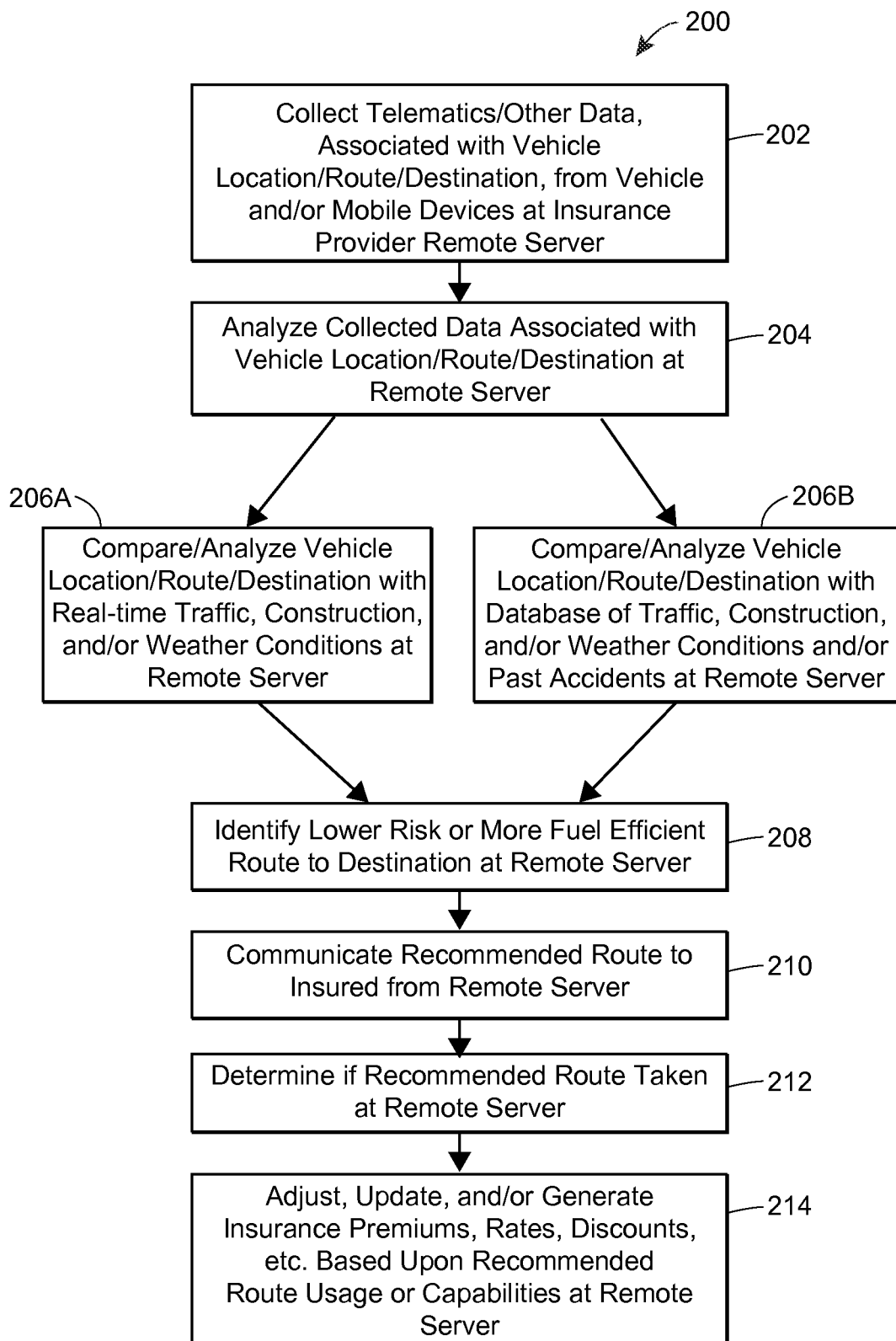
FIG. 4 illustrates an exemplary computer-implemented method of providing intelligent routing to reduce risk and/or the likelihood of an insured event occurring, according to one embodiment.

FIG. 4 illustrates an exemplary computer-implemented method 200 of providing intelligent routing to reduce risk and/or the likelihood of an insured event from occurring. In some embodiments, the method 200 may be implemented in whole or in part by one or more components of the system 1 depicted in FIG. 1. For example, the method 200 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1.

The method 200 may include receiving trip information including a vehicle's destination, planned route, and/or current location. As seen in FIG. 4, for example, the method 200 may include collecting telematics and/or other data associated with the vehicle's location, route, and/or destination (and possibly other information, such as the vehicle's origination point) at an insurance provider remote server (block 202). The data may include GPS, navigation, and/or other data associated with, or generated by, the driver's mobile device, the driver's vehicle (or a computer system thereof), another vehicle (e.g., a vehicle in the vicinity of the driver's vehicle), V2V communication, and/or roadside equipment and/or infrastructure, for example.

The method 200 may also include analyzing the data/information collected at block 202 (block 204). In some embodiments and/or scenarios, the method 200 may include comparing/analyzing the vehicle location, route, and/or destination with real-time traffic, construction, and/or weather conditions (block 206A). The real-time traffic, construction, and/or weather conditions may be telematics data collected from other vehicles (and/or roadside equipment or infrastructure, etc.), for example. In other embodiments and/or scenarios, the method 200 may include comparing/analyzing the vehicle location, route, and/or destination with information in a database of traffic conditions, construction conditions, weather conditions, and/or past accidents (block 206B). The method 200 may include building the database using traffic, construction, weather, and/or accident information gathered from one or more sources (e.g., news feeds, telematics data, etc.), for example.

The method 200 may also include identifying a lower risk route or routes between the vehicle's current location and the destination (block 208). For example, the method 200 may include identifying areas (e.g., roads or road segments) associated with higher risk of vehicle accident using collected vehicle telematics data and/or database (e.g., traffic, construction, weather, accident, etc.) information, and the route(s) may be identified/determined at block 208 such that those high-risk areas are avoided. Alternatively, as seen in FIG. 4, the method 200 may include identifying a more fuel-efficient route from the vehicle's current location to the destination at block 208.

The method 200 may also include communicating at least one of the one or more identified lower risk routes to the driver (e.g., the insured) as a recommended route to the destination (block 210). The route may be communicated via wireless communication to a mobile device and/or a smart vehicle of the driver (e.g., to mobile device 10, and/or a vehicle navigation system of vehicle 8, of FIG. 1), for example.

The method 200 may also include determining whether the recommended route was taken by the driver based upon analysis of telematics and/or other data (block 212). For example, GPS data may be received from the driver's mobile device or smart vehicle, and used to determine whether the recommended route was followed or a different route was taken instead.

The method 200 may also include adjusting, updating, and/or generating one or more insurance-related items based upon the determination at block 212 (block 214). The insurance-related item(s) may include, for example, parameters of the insurance policy (e.g., a deductible), a premium, a rate, a discount, and/or a reward. Alternatively, or additionally, the insurance-related item(s) may be adjusted, updated, and/or generated (e.g., insurance discounts may be provided) based upon an amount of usage, by the driver or another individual associated with the same insurance policy, of the intelligent routing functionality (e.g., a number or percentage of recommended routes taken, etc.).

In other embodiments, the method 200 may include additional, fewer, or alternate actions as compared to those shown in FIG. 4, including any of those discussed elsewhere herein. For example, the method 200 may omit block 212 and/or block 214.

As can be seen from the above discussion, the method 200 may efficiently determine low-risk routes for drivers. For instance, the processor 62 of FIG. 1 may centrally determine low-risk routes for numerous different drivers in much less time than would be needed if those drivers were to instead use personal (e.g., mobile) computing devices to directly collect, and manually review, information (e.g., past or current accident information) needed to identify their own low-risk routes.

XI. Additional Exemplary Intelligent Routing Methods

In another aspect, a computer-implemented method of intelligent routing may be provided. The method may include (1) collecting telematics and/or other data and/or building a database related to multiple vehicle accidents; (2) identifying, via a processor or remote sever, areas of higher than average vehicle accidents and/or less risky travel routes or roads; (3) receiving, at or via the remote server, a destination, a planned route, and/or a current location of a vehicle, such as from telematics related data; (4) based upon the destination, planned route, or current location of the vehicle, determining, at or via the remote server, a recommended route to the destination that avoids the areas of higher than average vehicle accidents and/or reduces accident associated risk; and/or (5) transmitting the recommended route from the remote server to the insured and/or driver via wireless communication for display on the vehicle navigation system and/or a mobile device associated with the insured and/or driver to facilitate the insured and/or driver traveling via a route associated with lower risk of accident.

The method may include generating insurance discounts based upon an amount that the insured uses the intelligent routing functionality provided by an insurance provider. The telematics and/or other data may include the data indicated elsewhere herein. The method of intelligent routing may include additional, fewer, or alternative actions, including those discussed elsewhere herein.

In another aspect, another method of intelligent routing may be provided. The method may include: (1) building a database associated with road traffic, construction areas, and/or vehicle accidents; (2) receiving, at or via an insurance provider remote server, a vehicle destination and a current vehicle location associated with an insured vehicle from the insured vehicle and/or a mobile device of a driver and/or insured associated with the insured vehicle, such as from telematics related data; (3) analyzing, at or via the insurance provider remote server, the vehicle destination and the current vehicle location associated with the insured vehicle in conjunction with the database associated with the road traffic, construction areas, and/or vehicle accidents to determine a low risk recommended or alternate route to the destination; and/or (4) transmitting from the remote server, the low risk recommended or alternate route to the destination to the vehicle and/or a mobile device associated with the driver and/or insured to facilitate the driver and/or insured taking the low risk recommended or alternate route to the destination.

The method may include generating insurance discounts based upon an amount of usage (by an insured) of the intelligent routing functionality provided by an insurance provider. The telematics and/or other data may include the data indicated elsewhere herein. The method of intelligent routing may include additional, fewer, or alternative actions, including those discussed elsewhere herein.

XII. Exemplary Theft Prevention or Mitigation Method

Figure 5:
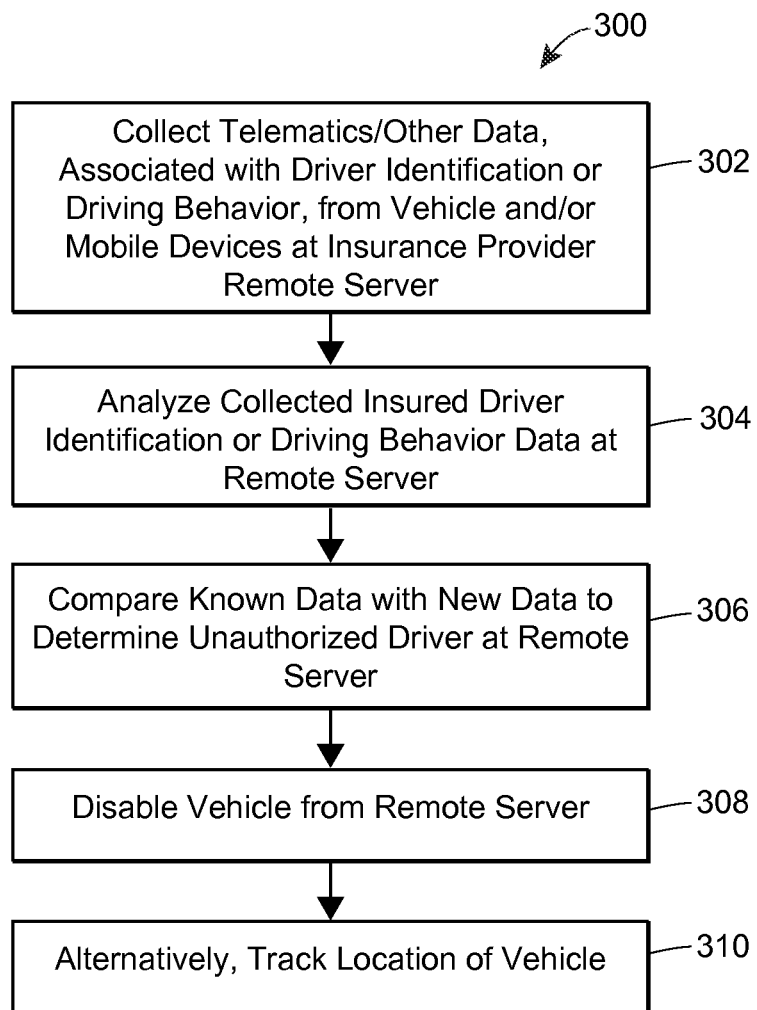
FIG. 5 illustrates an exemplary computer-implemented method of theft prevention and/or mitigation, according to one embodiment.

FIG. 5 illustrates an exemplary computer-implemented method 300 of theft prevention or mitigation. In some embodiments, the method 300 may be implemented in whole or in part by one or more components of the system 1 depicted in FIG. 1. For example, the method 300 may be implemented by one or more servers remote from the components (e.g., sensors, vehicles, mobile devices, etc.) sourcing telematics data, such as the server 40 (e.g., processor(s) 62 of the server 40 when executing instructions stored in the program memory 60 of the server 40) or another server not shown in FIG. 1. While the blocks of FIG. 5 refer to a "remote server," however, it is understood that other components may implement the method 300 in other embodiments. For example, the method 300 may be implemented by a vehicle controller, such as the smart vehicle controller 14 of FIGS. 1 and 2, or another vehicle controller not shown in FIG. 1 or 2.

The method 300 may include collecting driver-related data over time (block 302). The data may be associated with one or more authorized drivers of an insured vehicle (e.g., a policy owner and one or more family members), with the driver(s) and vehicle being covered by an insurance policy issued by an insurance provider (e.g., an insurance provider associated with one or more servers implementing the method 300, in one embodiment). In particular, the collected driver-related data may be associated with identification and/or driving behavior of the driver(s). For example, the driver-related data may include data indicative of driver weights, driver appearances, acceleration, braking and/or cornering behaviors of the drivers, and so on.

The driver-related data may include telematics data, and possibly other data, collected from one or more sources. For example, the driver-related data may include data associated with or generated by one or more mobile devices (e.g., mobile device 10 of FIGS. 1 and 2); an insured vehicle or a computer system of the insured vehicle (e.g., vehicle 8 or smart vehicle controller 14 of FIGS. 1 and 2, or one or more sensors mounted on the vehicle, such as a driver's seat weight sensor, or a vehicle-mounted camera for capturing images of drivers, etc.); a vehicle other than the insured vehicle (e.g., vehicle 6 of FIG. 1); vehicle-to-vehicle (V2V) communication (e.g., communications between vehicle 8 and vehicle 6 in FIG. 1); and/or roadside equipment or infrastructure located near a location of the vehicle accident (e.g., infrastructure components 26 of FIG. 1). Generally, the driver-related data may include any one or more of the types of data discussed above in Section I and/or II (and/or other suitable types of data), and may be collected according to any of the techniques discussed above in Section I and/or II (and/or other suitable techniques).

The collected driver-related data may be analyzed (block 304). For example, the data may be analyzed in order to determine an "electronic signature" for the mobile device of each authorized driver. As another example, vehicle operation data such as acceleration, braking and cornering, and/or other data, may be analyzed to determine higher-level behaviors of a driver (e.g., how often the driver brakes suddenly, or how often and/or by how much the driver exceeds the speed limit, etc.). Data may also be analyzed to categorize the data according to driver (e.g., determine, based upon weights or other identifying data, which driving behaviors correspond to which authorized driver, etc.).

While not shown in FIG. 5, the method 300 may also include a block in which a database associated with the authorized driver(s) is built based upon the driver-related data. For example, the output data produced by the analysis at block 304 (e.g., driver-specific weights, images or facial features, driving behaviors, etc.) may be stored in the database.

The known data (e.g., stored in the database) may be compared to new data to determine that a driver is unauthorized, i.e., not one of the individuals covered by the insurance policy (block 306). While referred to here as an unauthorized "driver," the individual may be currently driving the insured vehicle, or may merely be attempting to start the vehicle or even just sitting in a seat (e.g., driver's seat) of the vehicle.

While not shown in FIG. 5, the method 300 may include a block in which current or real-time driver-related data is collected prior to making the comparison at block 306. For example, current telematics and/or other data associated with the unauthorized individual may be collected (e.g., in a manner similar to that described above in connection with block 302) in order to determine identifying characteristics and/or driving behaviors of the individual.

The comparison at block 306 may include, for example, comparing a weight of the current driver with the weights of each authorized driver (e.g., based upon data that was generated by a driver's seat weight sensor of the insured vehicle), comparing an appearance of the current driver with the appearance of each authorized driver (e.g., based upon image data captured by a vehicle-mounted camera and using suitable image processing techniques), and/or comparing electronic signatures or signals of mobile devices of the authorized drivers with an unknown electronic signature or signal of an unrecognizable mobile device associated with the unauthorized individual. Additionally or alternatively, the comparison may include comparing acceleration, braking and/or cornering behaviors or patterns of the current driver with like behaviors or patterns of each authorized driver, etc.

After determining that the current driver is unauthorized, the insured vehicle may be disabled (block 308). For example, a remote server implementing the method 300 may send a wireless signal to a vehicle controller within the insured vehicle (e.g., smart vehicle controller 14 of FIG. 1), causing the insured vehicle to gradually and slowly come to a halt (if currently moving), or preventing the insured vehicle from being started (if not yet moving), etc. In some embodiments, the disablement/prevention may only occur if an authorized driver (e.g., the policy owner) acknowledges/confirms that the person currently driving (or attempting to start, etc.) the insured vehicle does not have the permission of the policy owner and/or vehicle owner to drive the insured vehicle.

Disablement of the vehicle may also depend upon other conditions being satisfied. For example, it may first need to be verified that the unauthorized individual is sitting in a driver's seat of the insured vehicle (e.g., rather than simply being a passenger). The verification may be made by triangulation or communication techniques between the unauthorized individual's mobile device and a vehicle-mounted transmitter, and/or using a visual image of the unauthorized individual, for example.

As an alternative to block 308, the method 300 may include tracking the location of the insured vehicle (block 310). Vehicle tracking may be accomplished using GPS coordinates, for example, and may persist until the vehicle is returned to the vehicle owner. The method 300 may also include transmitting a current GPS location of the insured vehicle to a mobile device of one of the authorized drivers (e.g., the policy owner and/or vehicle owner), and/or to a third party remote server (e.g., a server associated with a police department).

In other embodiments, the method 300 may include additional, fewer, or alternate actions as compared to those shown in FIG. 5, including any of those discussed elsewhere herein. For example, instead of (or in addition to) block 308, the method 300 may include notifying one of the authorized drivers (e.g., the policy owner) and/or authorities (e.g., a server of a police department), via wired or wireless communications, that the insured vehicle was (or may be) stolen.

As can be seen from the above discussion, the method 300 may efficiently prevent vehicle theft, or efficiently mitigate the losses and/or inconveniences due to such a theft. For instance, the processor 62 of FIG. 1 may detect a likely vehicle theft far more quickly than if an insurance provider employee were to input theft reporting data to server 40 only after an insured or other individual recognized, and then called to report, the theft.

XIII. Additional Exemplary Theft Prevention or Mitigation Method

In one aspect, a computer-implemented method of vehicle theft prevention or mitigation may be provided. The method may include: (1) collecting or receiving telematics and/or other data at or via a remote server associated with an insurance provider (or at or via a vehicle controller) over time, the telematics and/or other data being associated with an insured driver or family member driving an insured vehicle (and/or their identification), the insured vehicle being covered by an insurance policy issued by the insurance provider; (2) building, at or via the remote server (or vehicle controller), a database of insured drivers or family members (i) authorized to drive the insured vehicle, and/or (ii) covered by the insurance policy; (3) collecting or receiving current telematics and/or other data at or via the remote server (or vehicle controller) associated with an individual attempting to start or currently driving the insured vehicle; (4) determining, at or via the remote server (or vehicle controller), that the individual attempting to start or currently driving the insured vehicle is not among the insured drivers or family members (i) authorized to drive the insured vehicle, or (ii) covered by the insurance policy; and/or (5) if so, then directing or controlling, at or via the remote server (or vehicle controller), a disablement of an operation of the insured vehicle (i.e., preventing the vehicle from operating, or safely or orderly slowing the down the vehicle to a halt and/or moving the vehicle off to the side of the road) and/or preventing the individual from starting or otherwise operating the insured vehicle to facilitate preventing or mitigating theft of the insured vehicle.

The determining, at or via the remote server (or vehicle controller), that the individual attempting to start, or currently driving, the insured vehicle is not among the insured drivers or family members (i) authorized to drive the insured vehicle, or (ii) covered by the insurance policy may be performed by comparing electronic signatures or signals of mobile devices of the insured drivers or family members with an unknown electronic signature or signal of a unrecognizable mobile device associated with the individual attempting to start, or currently driving, the insured vehicle, or otherwise sitting in a driver's seat of the insured vehicle.

The method may include verifying, before preventing operation of the insured vehicle, that the unknown individual attempting to start, or currently driving, the insured vehicle is sitting in the driver's seat of the insured vehicle, such as via (a) triangulation or communication techniques between the unrecognizable mobile device and vehicle mounted transmitters, and/or (b) using visual images gathered or collected from the telematics and/or other data.

In one embodiment, determining, at or via the remote server (or vehicle controller), that the individual attempting to start, or currently driving, the insured vehicle is not among the insured drivers or family members (i) authorized to drive the insured vehicle, or (ii) covered by the insurance policy is performed by comparing electronic signatures or signals of various mobile devices. In another embodiment, determining, at or via the remote server (or vehicle controller), that the individual attempting to start, or currently driving, the insured vehicle is not among the insured drivers or family members (i) authorized to drive the insured vehicle, or (ii) covered by the insurance policy is performed by comparing (a) visual images (such as gathered by vehicle mounted cameras or mobile devices) or weights (such as determined from seat sensors) of the insured drivers or family members with (b) visual images or a weight of the individual attempting to start, or currently driving, the insured vehicle, respectively.

In one aspect, the telematics and/or other data may include data associated with, or generated by, mobile devices, such as smart phones, smart glasses, and/or smart wearable electronic devices capable of wireless communication. The telematics and/or other data may include data associated with, or generated by, an insured vehicle or a computer system of the insured vehicle. The telematics and/or other data may include data associated with, or generated by, (i) a vehicle other than the insured vehicle; (ii) vehicle-to-vehicle (V2V) communication; and/or (iii) road side equipment or infrastructure.

The method may further include, when it is determined, at or via the remote server (or vehicle controller), that the individual attempting to start, or currently driving, the insured vehicle is not among the insured drivers or family members (i) authorized to drive the insured vehicle, or (ii) covered by the insurance policy, generating a message (or wireless communication) and transmitting the message from the remote server (or vehicle controller) to a mobile device of one of the insured drivers or family members, or to authorities to facilitate vehicle recapture or safety. The method may include tracking the GPS location of the insured vehicle at the remote server (or vehicle controller), and/or transmitting the present GPS location of the insured vehicle to a mobile device of an insured or to a third party remote server, such as a police department. The method may include additional, fewer, or alternate actions, including those discussed elsewhere herein.

XIV. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and systems disclosed herein without departing from the spirit and scope defined in the appended claims. Finally, the patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method of analyzing mobile device-generated telematics data, the method comprising:
   generating, by a mobile device communicatively connected to a network and associated with a driver or an insured and located inside an insured vehicle during a vehicle accident, time-stamped accident data associated with the vehicle accident involving the driver, the time-stamped accident data including vehicle telematics data generated before, during, and after the vehicle accident by the mobile device of the driver, and vehicle-to-vehicle (V2V) communication data associated with, or generated by, V2V communication between the insured vehicle and at least one additional vehicle;
   immediately transmitting, from the mobile device to one or more remote servers located remotely from the mobile device and communicatively connected to the network via wireless communication, the time-stamped accident data following the vehicle accident;
   analyzing, by the one or more remote servers, the time-stamped accident data to determine an indication of a change in speed of the insured vehicle during the vehicle accident based upon the telematics data and a change in speed of the at least one additional vehicle during the vehicle accident based upon the V2V communication data received directly by the insured vehicle from the at least one additional vehicle; and
   automatically and remotely determining, by the one or more remote servers and based upon the analysis of the accident data, a severity of damage to the insured vehicle based at least upon the change in speed of the insured vehicle as determined by the time-stamped accident data generated by the mobile device located inside the insured vehicle and the change in speed of the at least one additional vehicle as determined by the V2V communication data.

2. The computer-implemented method of claim 1, wherein generating the time-stamped accident data further includes collecting data associated with, or generated by, the insured vehicle or a computer system of the insured vehicle.

3. The computer-implemented method of claim 1, wherein generating the time-stamped accident data further includes collecting data associated with, or generated by, a vehicle other than the insured vehicle.

4. The computer-implemented method of claim 1, wherein generating the time-stamped accident data further includes collecting data associated with, or generated by, roadside equipment or infrastructure located near a location of the vehicle accident.

5. The computer-implemented method of claim 1, the method further comprising:
   generating, by the one or more remote servers, an estimated insurance claim based upon the determined severity of the damage to the insured vehicle.

6. The computer-implemented method of claim 5, the method further comprising:
   transmitting, via wireless communication, the estimated insurance claim from the one or more remote servers to the mobile device to facilitate presenting all, or a portion of, the estimated insurance claim to the driver or the insured; and
   receiving, at the one or more remote servers, a wireless communication from the driver or the insured indicating approval, rejection, or modification of the estimated insurance claim.

7. The computer-implemented method of claim 6, the method comprising adjusting, generating, or updating, at the one or more remote servers and based upon the estimated insurance claim, one or more insurance-related items, the one or more insurance related items including one or more of (i) parameters of the insurance policy; (ii) a premium; (iii) a rate; (iv) a discount; or (v) a reward.

8. A computer system for analyzing mobile device-generated telematics data, the system comprising:
   a mobile device communicatively connected to a network, the mobile device associated with a driver or an insured and located inside an insured vehicle during a vehicle accident, wherein the mobile device is configured to:
      generate time-stamped accident data associated with the vehicle accident involving the driver, the time-stamped accident data including vehicle telematics data and vehicle-to-vehicle (V2V) communication data associated with, or generated by, V2V communication between the insured vehicle and at least one additional vehicle, and cause the time-stamped accident data to be transmitted from the mobile device to a remote server immediately following the vehicle accident;

one or more processors of the remote server located remotely from the mobile device and communicatively connected to the network; and one or more memories storing instructions that, when executed by the one or more processors, cause the one or more processors to:

receive the time-stamped accident data from the mobile device, analyze the time-stamped accident data to determine an indication of a change in speed of the insured vehicle during the vehicle accident based upon the telematics data and a change in speed of the at least one additional vehicle during the vehicle accident based upon the V2V communication data received directly by the insured vehicle from the at least one additional vehicle, and automatically and remotely determine, based upon the analysis of the time-stamped accident data, a severity of a damage to the insured vehicle based upon the change in speed of the insured vehicle as determined by the time-stamped accident data generated by the mobile device and the change in speed of the at least one additional vehicle as determined by the V2V communication data.

9. The computer system of claim 8, wherein the instructions, when executed by the one or more processors, further cause the one or more processors to:

generate an estimated insurance claim based upon the determined severity of the damage to the insured vehicle.

10. The computer system of claim 9, wherein the instructions, when executed by the one or more processors, further cause the one or more processors to:

cause the estimated insurance claim to be transmitted, via wireless communication, to the mobile device to facilitate presenting all, or a portion of, the estimated insurance claim to the driver or the insured, and receive a wireless communication from the driver or the insured indicating approval, rejection, or modification of the estimated insurance claim.

11. The computer system of claim 10, wherein the instructions, when executed by the one or more processors, further cause the one or more processors to:

adjust, generate, or update one or more insurance-related items based upon the estimated insurance claim, the one or more insurance-related items including one or more of (i) parameters of the insurance policy; (ii) a premium; (iii) a rate; (iv) a discount; or (v) a reward.

12. The computer system of claim 8, wherein the time-stamped accident data further includes data associated with, or generated by, the insured vehicle or a computer system of the insured vehicle.

13. The computer system of claim 8, wherein the time-stamped accident data further includes data associated with, or generated by, a vehicle other than the insured vehicle.

14. The computer system of claim 8, wherein the time-stamped accident data further includes data associated with, or generated by, roadside equipment or infrastructure located near a location of the vehicle accident.

15. A computer-implemented method of generating an estimated insurance claim from analysis of mobile device-generated telematics data, the method comprising:

generating, by a mobile device communicatively connected to a network and associated with a driver or an insured and located inside the insured vehicle during a vehicle accident, time-stamped accident data associated with the vehicle accident involving the driver, the time-stamped accident data including vehicle telematics data generated by the mobile device of the driver, and vehicle-to-vehicle (V2V) communication data associated with, or generated by, V2V communication between the insured vehicle and at least one additional vehicle;

immediately transmitting, from the mobile device to a remote server located remotely from the mobile device and communicatively connected to the network via wireless communication, the time-stamped accident data following the vehicle accident;

analyzing, by the one or more remote servers, the time-stamped accident data to determine an indication of a change in speed of the insured vehicle during the vehicle accident based upon the telematics data and a change in speed of the at least one additional vehicle during the vehicle accident based upon the V2V communication data received directly by the insured vehicle from the at least one additional vehicle;

automatically and remotely determining, by the one or more remote servers and based upon the analysis of the time-stamped accident data, a severity of the vehicle accident based upon the change in speed of the insured vehicle as determined by the time-stamped accident data generated by the mobile device associated with the insured vehicle and the change in speed of the at least one additional vehicle as determined by the V2V communication data; and generating an estimated insurance claim, at the one or more remote servers, based at least upon the determined severity of the vehicle accident.

16. The computer-implemented method of claim 15, the method further comprising:

transmitting, via wireless communication, the estimated insurance claim from the one or more remote servers to a mobile device of the driver or the insured for review, approval, or modification to facilitate prompt handling of the insurance claim.

17. The computer-implemented method of claim 16, the method further comprising receiving, at the one or more remote servers and from the mobile device of the driver or the insured, a wireless communication indicating rejection, approval, or modification of the estimated insurance claim.

18. The computer-implemented method of claim 17, the method further comprising:

adjusting, generating, or updating, at the one or more remote servers and based upon the estimated insurance claim, one or more insurance-related items, the one or more insurance related items including one or more of (i) parameters of the insurance policy; (ii) a premium; (iii) a rate; (iv) a discount; or (v) a reward; and transmitting information indicative of the adjusted, generated, or updated insurance-related items from the one or more remote servers to the mobile device, to be displayed on the mobile device for review, modification, or approval by the driver or the insured.

* * * * *